United States Patent Office 3,644,601
Patented Feb. 22, 1972

3,644,601
CONTROL OF ISOMER RATIO IN REACTION PRODUCTS PREPARED BY PHOSPHORYLATION OF ENOLATE IONS
Bernard Miller, Amherst, Mass., and Howard Margulies, Princeton Junction, N.J., assignors to American Cyanamid Company, Stamford, Conn.
Continuation-in-part of application Ser. No. 659,014, Aug. 8, 1967. This application May 7, 1969, Ser. No. 822,619
Int. Cl. C07f 9/08, 9/12; A01n 9/36
U.S. Cl. 260—972
6 Claims

ABSTRACT OF THE DISCLOSURE

Enolate ions are phosphorylated in the presence of a solvent and a strong base to yield a product mixture containing trans and cis isomers. Certain unique combinations of solvents and bases provide reaction products in which the trans isomer predominates while other combinations provide reaction products in which the cis isomer predominates. Since one isomer often exhibits superior pesticidal activity when compared to the other isomer, the processes of this invention provide a convenient route for obtaining the desired isomer.

CROSS REFERENCE TO RELATED APPLICATIONS

This is a continuation-in-part application of copending application Ser. No. 659,014, now U.S. Pat. 3,579,614, filed in the name of the same inventors on Aug. 8, 1967, relating to 2-cyanovinyl phosphates and phosphorothioates and isomers thereof.

BACKGROUND OF THE INVENTION

This invention is concerned with the distribution of trans and cis isomers in the reaction product obtained by the phosphorylation of enolate ions in accordance with the following equation:

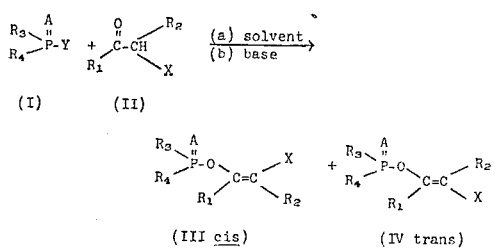

wherein:

$R_1$ is hydrogen or lower alkyl,
$R_2$ is hydrogen, lower alkyl, or phenyl,
$R_3$ is lower alkoxy,
$R_4$ is lower alkoxy, lower alkyl, or phenyl,
X is $CN \cdot COOR_5 \cdot CONR_1R_2 \cdot COR_1$, benzoyl- or $R_3R_4P(A)$,
$R_5$ is lower alkyl, phenyl, or benzyl,
A is oxygen or sulfur, and
Y is halo.

The mechanism by which the reaction proceeds involves the initial transformation of the reactant aldehyde or ketone (II) which is to supply the ultimate vinyl carbons to an enolate anion in the presence of an acid consuming agent such as a strong base in accordance with the following equation:

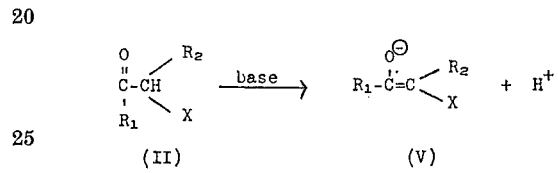

The enolate anion (V) then reacts with the phosphorylating agent (I) to produce a reaction product containing a mixture of the cis (III) and trans (IV) isomers.

As used throughout this specification:
The term "lower alkyl" means straight and branched chain alkyl radicals containing from 1 to 4 carbon atoms; illustratative members are methyl, ethyl, n-propyl, isopropyl, n-butyl, isobutyl, secondary butyl, and tertiary butyl.
The term "lower alkoxy" means alkoxy radicals containing from 1 to 4 carbon atoms; illustrative members are methoxy, ethoxy, propoxy, and butoxy.
The term "halo" means chlorine, bromine, iodine, and fluorine.
A variety of such reactions are known with the products therefrom having utility as pesticides of various types. For example, see Lichtenthaler's survey in Chem. Reviews 61, pg. 620–621 (1961) and the references cited therein.
The products from such reactions usually contain a mixture of the trans and cis isomers. There are occasions when it becomes quite desirable to separate these isomers from one another because of the more desirable properties possessed by one of the isomers. An example of this occurs with pesticidal compounds wherein one isomer demonstrates greater activity than another. Such an effect has been noted by R. D. O'Brien (Toxic Phosphorus Esters, Academic Press, New York, 1960, pg. 325) with regard to the trans and cis isomers of thiono-phosdrin, for example; one isomer is reported to be 20 times more toxic to the housefly than to the mouse while the other isomer is only 3 times more toxic. Similarly, U.S. Pat. 3,065,257 teaches the enhanced insecticidal activity demonstrated by the cis isomer of certain phosphate triester compounds as compared to the trans isomer. Applicants have noted similar pesticidal effects in the isomeric vinyl compounds represented by Formulae III and IV hereinabove as illustrated by the data of Examples 23 to 25 hereinbelow.

In cases where one isomer is desired and the other is not, it would be an advantage if process conditions could be controlled to give a reaction product enriched in the desired isomer. Unfortunately such a desirable process has not been hitherto available. The result is that one is left with a product mixture containing both the trans and cis isomer which must then be tediously purified to produce the desired isomer or, alternatively, the mixture must be subsequently treated with an acid or other catalysts in order to convert the unwanted isomer into the wanted isomer (see U.S. Pat. 3,065,257).

It is therefore an object of this invention to provide processes which permit direct preparation of a reaction product enriched in the desired isomer thereby eliminating the tedious purification procedures or subsequent chemical treatments heretofore required to prepare a desired isomer in high purity.

It is another object of this invention to permit such direct preparation of a reaction product enriched in the desired isomer by the selection of certain reaction solvents and bases which favor predomination of the trans or cis isomer in the reaction product.

These and other objects of this invention will be apparent from a total reading of this specification.

SUMMARY OF THE INVENTION

This invention relates to an improvement in the process for preparing reaction products as described above which permits preparation of a reaction product wherein either the cis isomer or the trans isomer, as desired, predominates.

The term "predominates" and derivatives thereof means that the weight ratio of the predominating isomer to the other isomer exceeds 1.0.

Applicants have found that when the reaction is carried out in the presence of certain unique combinations of solvents and bases selected from the group consisting of alkali metal carbonates, lower(alkoxides), hydroxides, and hydrides where the term "alkali metal" means sodium, potassium, rubidium and lithium, a reaction mixture is produced in which the trans isomer predominates; on the other hand, certain other combinations produce reaction mixtures in which the cis isomer predominates thereby affording a most convenient method of preparing a reaction product enriched in whatever isomer is desired. Moreover, the improved processes of this invention can also be used to obtain a broad spectrum of trans/cis isomer ratios in a reaction product merely by altering the solvent and base employed in the reaction.

In accordance with this invention, it has been found that a reaction mixture wherein the trans isomer predominates can be prepared under either of the following conditions:

(a) when the solvent has a dielectric constant greater than about 16 and the alkali metal of the strong base is either rubidium or potassium, or (b) when the solvent has a dielectric constant greater than about 37 and the alkali metal of the strong base is sodium.

Applicants have furthermore found that a reaction product wherein the trans isomer predominates is produced regardless of the value of the solvent dielectric constant when the base is a tetra(lower)alkylammonium hydroxide or an aryltri(lower)alkyl ammonium hydroxide. The term "aryl" means an aromatic radical containing from 6 to 8 carbon atoms.

A reaction mixture wherein the cis isomer predominates can be prepared under either of the following conditions:

(a) when the solvent has a dielectric constant less than about 16 and the alkali metal of the strong base is rubidium or potassium, or (b) when the alkali metal is lithium regardless of the value of the solvent dielectric constant.

DESCRIPTION OF THE PREFERRED EMBODIMENTS

Reactants

Figure 1:
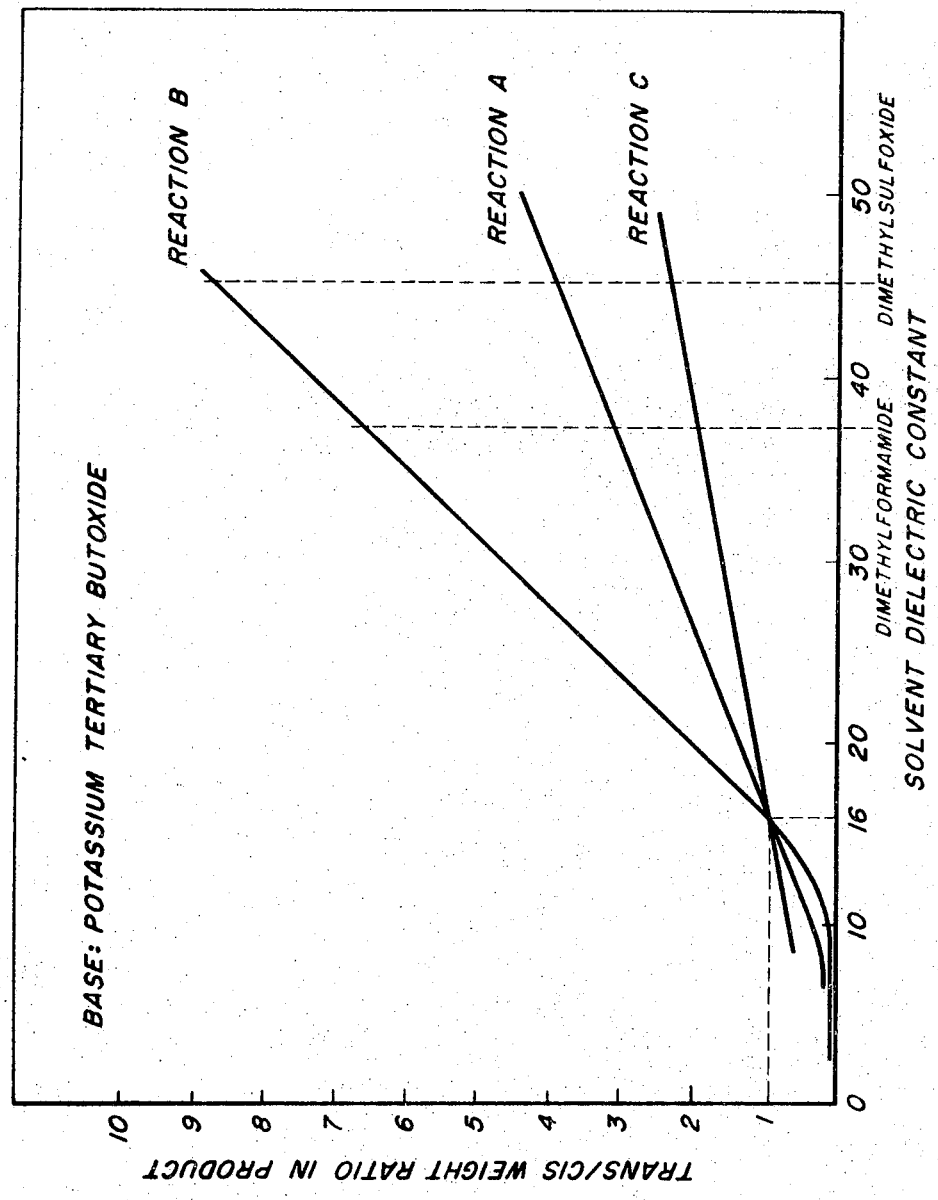
FIG. 1 illustrates the effect of solvent dielectric constant upon the trans/cis weight ratio in the reaction product for a variety of reactions.

The following phosphorylating agents (I) are illustrative of those which are suitably employed in the processes of this invention:

| $R_3$ | $R_4$ | A | Y |
|---|---|---|---|
| $CH_3O$ | $CH_3$ | O | Cl |
| $C_2H_5O$ | $C_2H_5O$ | O | Cl |
| $n-C_3H_7O$ | $n-C_3H_7$ | O | Cl |
| $i-C_3H_7O$ | $i-C_3H_7O$ | O | Cl |
| $CH_3O$ | $C_6H_5$ | O | Cl |
| $CH_3O$ | $CH_3O$ | O | Br |
| $C_2H_5O$ | $C_2H_5$ | O | Br |
| $C_2H_5O$ | $i-C_3H_7$ | O | Br |
| $CH_3O$ | $CH_3$ | O | I |
| $C_2H_5O$ | $C_2H_5O$ | O | I |
| $CH_3O$ | $CH_3$ | O | F |
| $C_2H_5O$ | $C_6H_5$ | O | F |
| $CH_3O$ | $CH_3$ | S | Cl |
| $C_2H_5O$ | $C_2H_5$ | S | Cl |
| $n-C_4H_9O$ | $n-C_3H_7O$ | S | Cl |
| $i-C_3H_7O$ | $C_6H_5$ | S | Cl |
| $CH_3O$ | $C_6H_5$ | S | Cl |
| $CH_3O$ | $CH_3$ | S | Br |
| $C_2H_5O$ | $C_2H_5$ | S | Br |
| $C_2H_5O$ | $i-C_4H_9O$ | S | Br |
| $CH_3O$ | $C_6H_5$ | S | I |
| $C_2H_5O$ | $C_2H_5$ | S | I |
| $CH_3O$ | $CH_3O$ | S | F |
| $C_2H_5O$ | $C_2H_5$ | S | F |

The following aldehydes and ketones (II) are illustrative of those which can be suitably employed in the processes of this invention.

| $R_1$ | $R_2$ | X |
|---|---|---|
| H | H | CN |
| H | $C_6H_5$ | CN |
| H | $C_6H_5$ | CN |
| H | $CH_3$ | CN |
| H | $C_2H_5$ | CN |
| $CH_3$ | H | $COOCH_3$ |
| $C_2H_5$ | H | $COOC_6H_5$ |
| H | $CH_3$ | $CON(CH_3)_2$ |
| $C_2H_5$ | H | $CON(C_2H_5)_2$ |
| H | H | $COCH_3$ |
| $CH_3$ | $CH_3$ | $COCH_3$ |
| $CH_3$ | H | $COC_2H_5$ |
| H | H | $C_6H_5CO$ |
| $CH_3$ | $CH_3$ | $C_6H_5CO$ |
| H | $C_6H_5$ | $C_6H_5CO$ |
| H | $C_2H_5$ | $C_6H_5CO$ |

TABLE—Continued

| R₁ | R₂ | X |
|---|---|---|
| H | H | $(CH_3O)_2\overset{O}{\underset{\|}{P}}$ |
| H | CH₃ | Same. |
| CH₃ | H | Do. |
| CH₃ | CH₃ | $(C_2H_5O)_2\overset{O}{\underset{\|}{P}}$ |
| H | H | Same. |
| CH₃ | C₆H₅ | Do. |
| CH₃ | H | Do. |
| CH₃ | CH₃ | $(n-C_3H_7)_2\overset{O}{\underset{\|}{P}}$ |
| H | H | $\begin{matrix}CH_3O\\C_2H_5O\end{matrix}\Big\rangle\overset{O}{\underset{\|}{P}}$ |
| H | H | $(CH_3O)_2\overset{O}{\underset{\|}{P}}$ |
| CH₃ | CH₃ | Same. |
| C₂H₅ | i-C₃H₇ | Do. |
| H | C₆H₅ | Do. |
| H | H | $(C_2H_5O)_2\overset{S}{\underset{\|}{P}}$ |
| CH₃ | CH₃ | Same. |
| n-C₃H₇ | H | Do. |
| i-C₃H₇ | CH₃ | Do. |
| H | H | $(n-C_3H_7O)_2\overset{S}{\underset{\|}{P}}$ |
| CH₃ | CH₃ | Same. |
| H | CH₃ | $(i-C_3H_7O)_2\overset{S}{\underset{\|}{P}}$ |
| CH₃ | H | $\begin{matrix}CH_3O\\C_2H_5\end{matrix}\Big\rangle\overset{S}{\underset{\|}{P}}$ |
| H | H | COOCH₂C₆H₅ |

All of the reactants embraced by the claims appended hereto are either available commercially or can be readily prepared in accordance with procedures well known to those skilled in the art using known starting materials.

The reactant aldehyde or ketone (II) may exist in tautomeric forms as shown below:

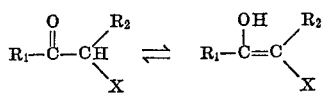

Such tautomeric forms are contemplated to fall within the scope of the invention.

Reaction conditions

The reaction proceeds satisfactorily at temperatures ranging from 0 to 100° C. and at subatmospheric, atmospheric and super-atmospheric pressures. Preferred reaction conditions are 25 to 75° C. and atmospheric pressure.

Solvents

A host of solvents can be used to carry out the reaction. These solvents include aromatic solvents containing from 6 to 8 carbon atoms such as toluene, benzene, and xylene; lower alkanols containing from 1 to 8 carbon atoms such as methanol, ethanol, isopropanol, butanol, pentanol, octanol, and t-butanol; low molecular weight (i.e., a molecular weight not exceeding about 200) glycol ethers such as diethylene glycol dimethyl ether (diglyme), ethylene glycol dimethyl ether (glyme), diethylene glycol diethyl ether, and ethylene glycol diethyl ether; and dipolar aprotic solvents, i.e., solvents which are substantially chemically inert toward reactants (II) and (III) as well as products (III) and (IV), which have a coordinated valence link between two originally neutral atoms whereby one loses and the other gains a share of two electrons, and which neither yield a proton to the solute, nor gain one from it. Illustrative dipolar aprotic solvents are dimethylsulfoxide (a highly preferred solvent), dimethylformamide, acetone, methyl isobutyl ketone, acetonitrile, nitrobenzene, N,N-dimethylacetamide, and the tetrahydrosulfolanes such as tetrahydrothiophene dioxide.

Preferred solvents will, of course, depend upon the composition of the reaction product which is desired. For products enriched in trans isomer, dimethylformamide and dimethylsulfoxide are preferred solvents.

Bases

Any strong base capable of generating an alkali metal cation in the reaction mixture can be employed in the processes of this invention. Among the bases which can be used are the alkali metal hydroxides, carbonates, lower alkoxides, and anhydrides. Illustrative bases are sodium hydroxide, potassium hydroxide, sodium carbonate, potassium carbonate, potassium-t-butoxide, sodium methoxide, potassium methoxide, lithium methoxide, sodium hydride, potassium hydride, and lithium hydride.

Suitable ammonium hydroxide type bases are tetramethylammonium hydroxide,
tetraethylammonium hydroxide,
dimethyl(diethyl)ammonium hydroxide,
phenyl(trimethyl)ammonium hydroxide,
phenyl(triethyl)ammonium hydroxide,
tolyl(trimethyl)ammonium hydroxide,
phenyl(tri-n-propyl)ammonium hydroxide,
tolyl(tri-n-butyl)ammonium hydroxides and the hydrates thereof. A preferred base is tetramethylammonium hydroxide pentahydrate.

The above bases are either available commercially or can be readily prepared in accordance with procedures well known to the skilled in the art.

The preferred alkali metal base will, of course, depend on the composition of the reaction product which is desired. For reaction products enriched in trans isomer, potassium tertiary butoxide is a preferred base.

The amount of base used can vary from 0.9 to 1.1 moles per mole of reactant.

Experimental conditions

All reactions were carried out under substantially the same conditions, which conditions are adequately described hereinbelow in Examples 3–22.

Effect of solvent polarity and the base cation upon trans/cis ratio

The effect of variations in the polarity of the reaction solvent (as measured by the solvent dielectric constant) upon the trans/cis ratio is clearly shown for a variety of reactions in which the base was kept constant (potassium-t-butoxide) by the data of Table I. These data are presented graphically in FIG. 1 and show that where the alkali metal is potassium and the dielectric constant of the solvent exceeds about 16, the trans/cis weight ratio in the product exceeds 1.0. Moreover, as the dielectric constant increases above 16, the trans/cis ratio similarly increases producing a product becoming progressively more enriched in the predominating trans isomer thereby affording a method for preparing a variety of compositions with varying trans/cis ratios. When products greatly enriched in trans isomer are desired, solvents having dielectric constants well in excess of 16 should be used. Preferred solvents for this purpose are dimethylsulfoxide and dimethylformamide.

TABLE I.—EFFECT OF SOLVENT DIELECTRIC CONSTANT [1] UPON ISOMER RATIO (BASE IS POTASSIUM-t-BUTOXIDE)

| Reaction designation | Reaction | Solvent | Solvent dielectric constant | Trans/cis ratio |
|---|---|---|---|---|
| A | $(C_2H_5O)_2\overset{S}{\underset{\parallel}{P}}Cl + CH_3\overset{O}{\underset{\parallel}{C}}CH_2CN \longrightarrow$ $(C_2H_5O)_2\overset{S}{\underset{\parallel}{P}}-O-\underset{CH_3}{\overset{\overset{\displaystyle CO C_2H_5}{\mid}}{C}}=\underset{H}{\overset{\overset{\displaystyle CN}{\mid}}{C}}$ (cis) $+$ $(C_2H_5O)_2\overset{S}{\underset{\parallel}{P}}-O-\underset{CH_3}{\overset{\overset{\displaystyle H}{\mid}}{C}}=\underset{CN}{\overset{\overset{\displaystyle CO C_2H_5}{\mid}}{C}}$ (trans) | Dimethylsulfoxide<br>Dimethylformamide<br>Methyl cyanide<br>Acetone<br>Iso-propyl<br>Methyl isobutylketone<br>Tertiary butanol<br>Benzene | 45.0<br>37.0<br>37.5<br>20.7<br>18.3<br>13.1<br>10.9<br>2.3 | 4.0<br>3.6<br>2.6<br>2.5<br>1.1<br>.63<br>.25<br>.15 |
| B | $(C_2H_5O)_2\overset{S}{\underset{\parallel}{P}}Cl + CH_3\overset{O}{\underset{\parallel}{C}}CH_2COC_2H_5 \longrightarrow$ $(C_2H_5O)_2\overset{S}{\underset{\parallel}{P}}-O-\underset{CH_3}{\overset{\overset{\displaystyle CO C_2H_5}{\mid}}{C}}=\underset{H}{\overset{\overset{\displaystyle H}{\mid}}{C}}$ (cis) $+$ $(C_2H_5O)_2\overset{S}{\underset{\parallel}{P}}-O-\underset{CH_3}{\overset{\overset{\displaystyle H}{\mid}}{C}}=\underset{\phantom{H}}{\overset{\overset{\displaystyle CO C_2H_5}{\mid}}{C}}$ (trans) | Dimethylsulfoxide<br>Dimethylformamide<br>Tertiary butanol<br>Benzene | 45.0<br>37.0<br>10.9<br>2.3 | 9.0<br>6.5<br>.18<br>.03 |
| C | $(CH_3O)_2\overset{S}{\underset{\parallel}{P}}Cl + HOCH{=}\underset{CN}{\overset{\overset{\displaystyle C_6H_5}{\mid}}{C}} \longrightarrow$ $(CH_3O)_2\overset{S}{\underset{\parallel}{P}}-O-\underset{H}{\overset{\overset{\displaystyle C_6H_5}{\mid}}{C}}=\underset{CN}{\overset{\overset{\displaystyle H}{\mid}}{C}}$ (cis) $+$ $(CH_3O)_2\overset{S}{\underset{\parallel}{P}}-O-\underset{H}{\overset{\overset{\displaystyle CN}{\mid}}{C}}=\underset{\phantom{H}}{\overset{\overset{\displaystyle C_6H_5}{\mid}}{C}}$ (trans) | Dimethylsulfoxide<br>Tertiary butanol | 45.0<br>10.9 | 2.3<br>.14 |

[1] The only variable.

Figure 2:
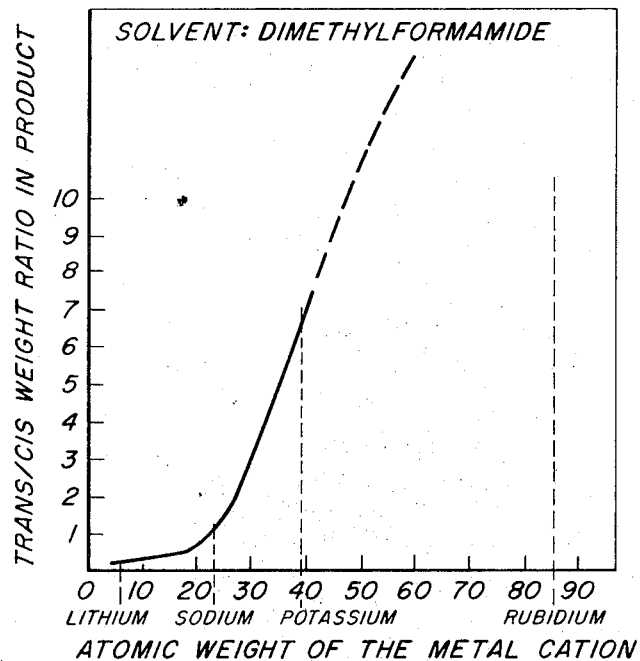
FIG. 2 illustrates the effect of the atomic weight (or size) of the alkali metal cation of the base upon the trans/cis weight ratio in the reaction product.

The effect of variations in the alkali metal of the base upon trans/cis ratio is clearly shown by the data in Table II which are presented graphically in FIG. 2. In obtaining these data there was no variation in the reaction solvent.

varies from 10.9 to 37; on the other hand, when tetramethylammonium hydroxide is the base, the trans/cis ratio is always substantially greater than 1.0 even when large changes in the value of the solvent dilectric constant occur.

TABLE II.—EFFECT OF VARIATIONS IN THE ALKALI METAL BASE [1] ISOMER RATIO (SOLVENT IS DIMETHYLFORMAMIDE)

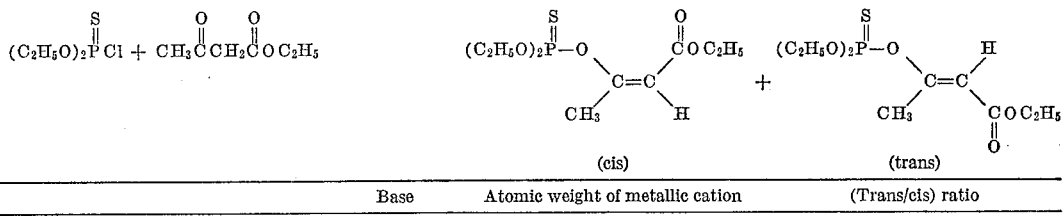

| | Base | Atomic weight of metallic cation | (Trans/cis) ratio |
|---|---|---|---|
| Variation in the alkali metal cation | KOCH₃ | 39.100 | 6.8 |
| | NaOCH₃ | 22.997 | 1.0 |
| | LiOCH₃ | 6.940 | 0.25 |
| Variation in the non-metallic portion of the base | KOCH₃ | | 6.8 |
| | KOC₄H₉ | | 6.5 |

[1] The only variable.

These data show that as the atomic weight of the alkali metal increases, there is a dramatic increase in the value of the trans/cis ratio. On the other hand, variations in the non-metallic portion of the base have no significant effect on the trans/cis ratio.

As can be seen from FIG. 2, the trans/cis mole ratio increases as the alkali metal atomic weight increases. Since rubidium is heavier than potassium, it is apparent that substitution of rubidium for potassium in the reactions shown in FIG. 1 will improve the trans/cis ratio over those shown thereby indicating that when the solvent dielectric constant exceeds 16 and the alkali metal of the strong base is either potassium or rubidium, the trans/cis ratio in the reaction product will exceed 1.0.

On the other hand, the data of FIG. 2 show that when the alkali metal is sodium and the solvent dielectric constant is a relatively high 37 (dimethylformamide), the trans/cis ratio is 1.0; thus to exceed a trans/cis ratio of 1.0 in cases where the alkali metal is sodium, it becomes necessary to employ solvents having dielectric constant greater than 37.

In cases where the alkali metal is lithium, the data of FIG. 2 coupled with that of FIG. 1 indicate that the cis isomer will predominate in the reaction product despite the value of the dielectric constant of the solvent.

THE DISTINCT BEHAVIOR OF ORGANIC SUBSTITUTED AMMONIUM HYDROXIDE BASES

Figure 3:
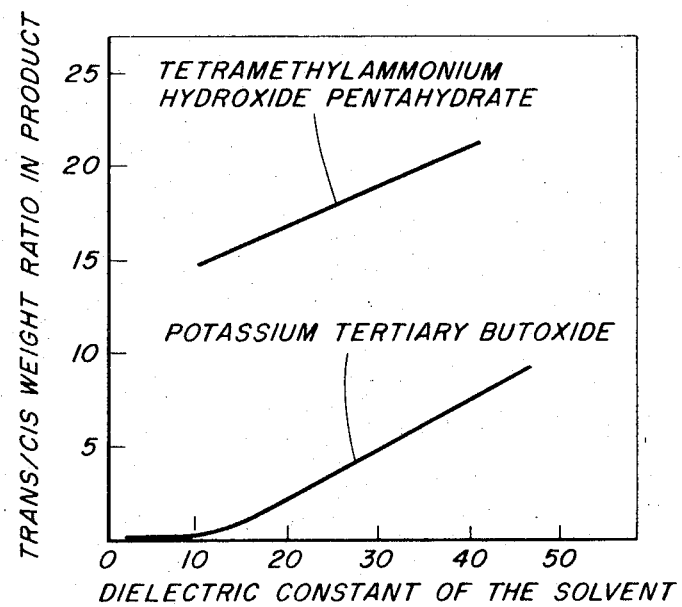
FIG. 3 illustrates the unusual ability of organic substituted ammonium hydroxide bases to produce predominantly the trans isomer regardless of the dielectric constant of the solvent.

The distinctive effect of organic substituted ammonium hydroxides as reaction bases is shown by the data in Table III which are depicted graphically in FIG. 3.

Theory

Based on the unusual results which have been observed, a plausible theory can be put forth in explanation thereof. Applicants, of course, do not intend to be bound by such a theory.

The above described phenomena can be explained by assuming that enolate ions exist as close ion pairs in which "chelation" between the metal ion and the enolate anion holds the anion in a cis configuration as shown below:

$$\begin{array}{c} \phantom{O}\phantom{xx}M^{\oplus}\phantom{xx} \\ O^{\diagup}\phantom{xxx}\diagdown X \\ | \phantom{xxxx} | \\ C = C \phantom{xx} \text{(in non-polar solvents)} \\ | \phantom{xxxx} | \\ R_1 \phantom{xx} R_2 \end{array}$$

wherein $M^{\oplus}$ is an alkali metal cation.

In polar solvents, the anion should have a much greater tendency to exist as a free (unpaired) ion. In this form, the normal repulsion between the two groups bearing partial negative charges should favor its existence in the trans form as shown below.

$$\begin{array}{c} O^{\ominus} \phantom{xx} R_2 \\ | \phantom{xxxx} | \\ C = C \phantom{xx} M^{\oplus} \phantom{xx} \text{(in polar solvents)} \\ | \phantom{xxxx} | \\ R_1 \phantom{xx} X \end{array}$$

TABLE III.—THE DISTINCTIVE EFFECT OF TETRAMETHYLAMMONIUM HYDROXIDE AS A REACTION BASE

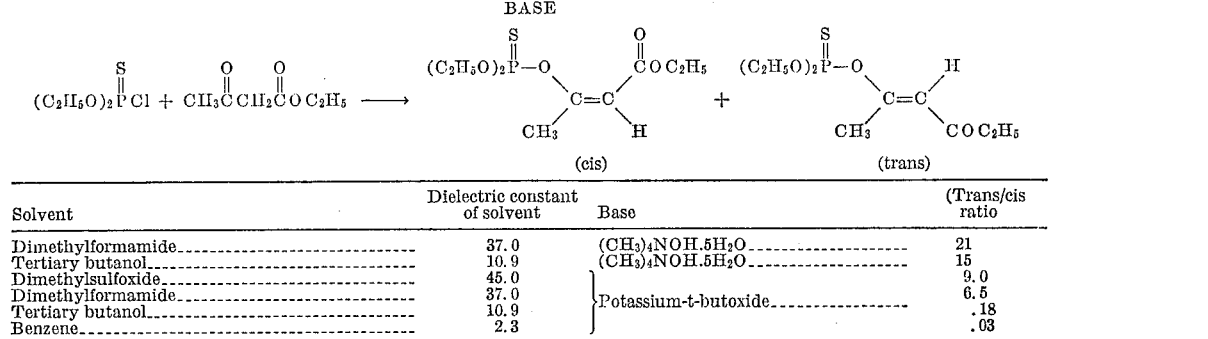

| Solvent | Dielectric constant of solvent | Base | (Trans/cis ratio) |
|---|---|---|---|
| Dimethylformamide | 37.0 | (CH₃)₄NOH·5H₂O | 21 |
| Tertiary butanol | 10.9 | (CH₃)₄NOH·5H₂O | 15 |
| Dimethylsulfoxide | 45.0 | | 9.0 |
| Dimethylformamide | 37.0 | Potassium-t-butoxide | 6.5 |
| Tertiary butanol | 10.9 | | .18 |
| Benzene | 2.3 | | .03 |

These data compare the composition of two reaction products prepared identically except in one case the base is potassium-t-butoxide and in other tetramethylammonium hydroxide pentahydrate. The data show a pronounced effect of the solvent dielectric constant upon trans/cis ratio when the base is potassium-t-butoxide with the ratio ranging from .18 to 6.5 as the dielectric constant If ion pairing in non-polar solvents is responsible for formation of cis products from enolate anions, the trans/cis ratio should decrease when the cation employed more strongly complexes the anion. Such a decrease in ion-pairing is conceivable in going to cations of larger size, i.e., from lithium to rubidium.

11

In the case of substituted ammonium hydroxide bases, no appreciable ion pairing should occur with the cation and the product trans/cis ratio in each solvent would be expected to approximate the trans/cis ratio of the enolate ions themselves.

It might be expected that as less concentrated solutions are employed, the percentage of dissociated ions would increase, and that the trans/cis ratio would similarly increase. This is indeed the case as shown by the data of Table IV. It should be noted that these reactions were all homogeneous, and were identical in all respects other than concentration.

TABLE IV.—EFFECT OF SOLVENT DILUTION ON ISOMER RATIO
(Base is potassium t-butoxide)

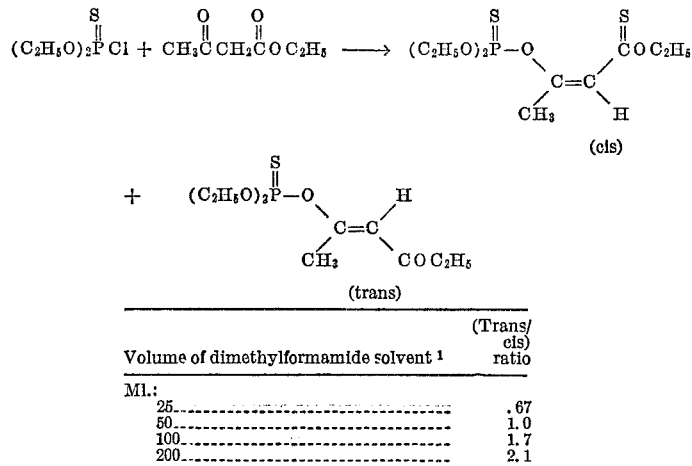

(cis)

(trans)

| Volume of dimethylformamide solvent [1] | (Trans/cis) ratio |
|---|---|
| Ml.: | |
| 25 | .67 |
| 50 | 1.0 |
| 100 | 1.7 |
| 200 | 2.1 |

[1] The only variable.

Utility

The compounds prepared by the inventive processes in both their trans and cis forms or as mixtures of both isomers are useful for controlling a wide variety of pests including insects, arachnids and nematodes. They may be applied to the foliage of plants as dusts or liquid sprays to protect them from insects which feed thereon; they may also be incorporated in or applied to the soil in order to protect germinating and growing plants from soil-borne pests which attack the root systems and stems of said plants; or they may be applied to the breeding sites of pests to control both the larval and adult stages of breeding pest populations. In the latter situations the compounds may be applied in conventional formulations such as dusts, dust concentrates, granular materials, wettable powders, emulsifiable concentrates and the like. They may be employed as an emulsion in water or other non-solvents to which suitable surfactants, wetting agents or emulsifying agents have been added. They may be applied on solid carriers, such as talcs and clays, as for example kaolin clay or fuller's earth, or on such carriers as chalk, wood flour, silica charcoal, activated carbon or other inert powders. As a wettable powder, the compound of this invention may be applied to easily wettable carrier materials, such as attaclay, with or without the aid of surfactants, or on less readily wettable carriers in combination with suitable surfactants.

Advantageously, the compounds of the invention may also be applied by the most modern techniques of low volume or ultra-low volume application wherein the compound is applied essentially as a technical material or in combination with a minor amount of solvent such as the slow evaporating, high aromatic solvents such as Panasol AN-5, Socal 44-L or Esso HAN (all commercially available). With some of the novel compounds prepared by this invention, toxicants such as malathion or dimethoate may be used as the solvent or diluent carrier for ultra-low volume application.

It is an advantage to obtain the compounds in either the trans or cis form due to differences in pesticidal activity between the isomers as clearly shown by the data presented in Examples 21 to 23 hereinbelow.

The following examples are provided to further illustrate the invention.

EXAMPLE 1

Preparation of O,O-diethyl-O-2-carbethoxy-1-methylvinyl phosphorothioate

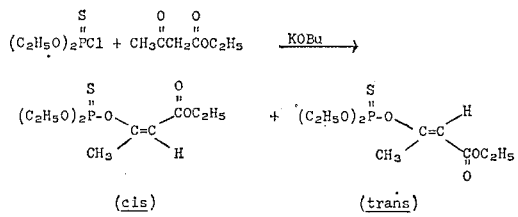

(cis)      (trans)

(a) Dimethylsulfoxide (dielectric constant=45) as the reaction solvent

Potassium-t-butoxide (5.6 g., 0.05 mole) was added to a solution of acetoacetic ester (6.55 g., 0.05 mole) in 50 ml. of dimethylsulfoxide. The mixture was cooled in ice and O,O-diethyl phosphorochloridothioate (9.4 g., 0.05 mole) added. The mixture was neutral in pH after two minutes. It was poured into water, the mixture extracted with methylene chloride, and the methylene chloride layer washed several times with water, dried over magnesium sulfate, and evaporated to give 10.0 g. (.035 mole, 71%) of yellow fluid. Its NMR spectra showed that the ratio of trans to cis isomer from the reaction was 9.0. Chromatography on magnesium silicate gave 4.8 g. of the pure trans isomer, $n_D^{25}$=1.4778.

Analysis.—Calculated for $C_{10}H_{19}PSO_5$ (percent): C, 42.6; H, 6.74; S, 11.35; P, 11.0. Found (percent): C, 42.34; H, 6.76; S, 11.65; P, 11.13.

(b) Tertiary butanol (dielectric constant=10.9) as the reaction solvent

To a mixture of acetoacetic ester (6.55 g., 0.05 mole) and potassium-t-butoxide (5.6 g., 0.05 mole) in 50 ml.

of t-butanol was added 9.4 g .(0.05 mole) of O,O-diethyl phosphorochloridothioate. The mixture was heated to 70° C. for 2 hours, and then worked up as described above to give 9.7 g. of yellow fluid (89%). Its NMR showed that the trans/cis ratio was 0.18. Chromatography on magnesium silicate gave 11.3 g. of the cis-isomer $n_D^{25}=1.4750$.

(c) Dimethylformamide and benzene as reaction solvents

The reactions were carried out substantially as described above in (a) and (b) except for the different solvent. The isomer distribution in the product was as follows:

Solvent: Trans/cis ratio
  Dimethylformamide _____ 6.5
  Benzene _____ 0.03

EXAMPLE 2

Use of tetramethylammonium hydroxide as a base in the preparation of O,O-diethyl-O-2-carbethoxy-1-methylvinyl phosphorothiate

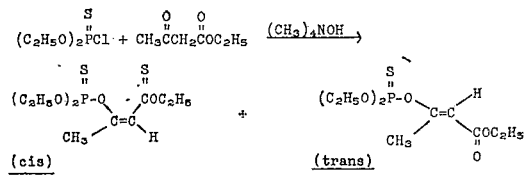

Following substantially the same procedure as that shown in Example 1 except replacing the potassium-t-butoxide with tetramethyl-ammonium hydroxide pentahydrate, the trans to cis ratio in the reaction product was 21 in the case of dimethsylformamide and 15 in the case of tertiary butanol in contradistinction to respective ratios of 6.5 and .18 when potassium-t-butoxide was employed as the base.

EXAMPLES 3–22

Following substantially the general experimental procedure shown below, a variety of compounds are prepared in the presence of a variety of solvents and alkali metal and substituted ammonium hydroxide bases (as listed heretofore) in order to study the effect of the solvent dielectric constant and type of base used upon the trans/cis isomer ratio in the product. The results obtained in all cases are substantially those shown by the data of Tables I, II, III, and as further shown by FIGS. 1, 2, and 3.

The products evaluated are listed below in Table V (substituents refer to compounds III and IV).

GENERAL EXPERIMENTAL PROCEDURE

In a typical reaction, 0.05 mole of the aldehyde or ketone (II) was dissolved in 50 ml. of solvent. Potassium-t-butoxide or other base (0.05 mole) was added and the mixture shaken until a homogeneous solution was obtained, and the mixture cooled to 20° C. in an ice bath. 0.05 mole of phosphorylating agent (I) was then added and the mixture was shaken and allowed to stand until the pH became lower than 8. Reactions in dimethylsulfoxide or dimethylformamide solvent were usually complete in a few minutes. Reactions in t-butanol normally required up to 24 hours. Alternatively, reactions in t-butanol, benzene, or methylisobutylketone were refluxed until reaction was complete. The mixture was then poured into water and extracted with methylene chloride or chloroform. The organic layer was washed thoroughly with water, dried, and evaporated to give the enol phosphate in yields of 70-90%. This was analyzed for trans/cis ratio by NMR or VPC. In synthetic runs, the crude product was chromatographed on neutral alumina with petroleum ether to give the invention and the generally higher potency of the trans isomer was the first to be eluted.

TABLE V

| Ex. No. | $R_1$ | $R_2$ | $R_3$ | $R_4$ | $R_5$ | A | X |
|---|---|---|---|---|---|---|---|
| 3 | H | $CH_3$ | $CH_3O$ | $CH_3O$ | H | O | CN |
| 4 | $CH_3$ | $CH_3$ | $C_2H_5O$ | $C_2H_5$ | H | O | $COOC_6H_5$ |
| 5 | H | H | $CH_3O$ | $C_2H_5O$ | $CH_3$ | O | $COOC_2H_5$ |
| 6 | i-$C_3H_7$ | $C_6H_5$ | $CH_3O$ | $CH_3O$ | n-$C_3H_7$ | O | $COOCH_2C_6H_5$ |
| 7 | H | $C_6H_5$ | $C_2H_5O$ | $C_2H_5$ | $CH_2C_6H_5$ | O | $CONH_2$ |
| 8 | H | $C_2H_5$ | $CH_3O$ | $CH_3O$ | H | O | $CONHCH_3$ |
| 9 | $C_2H_5$ | $C_2H_5$ | n-$C_3H_7$ | $C_6H_5$ | H | O | $CON(C_2H_5)_2$ |
| 10 | $CH_3$ | $CH_3$ | n-$C_4H_9$ | n-$C_4H_9$ | H | O | $COOCH_3$ |
| 11 | H | $C_6H_5$ | $CH_3O$ | $CH_3O$ | $C_2H_5$ | O | $COCH_3$ |
| 12 | H | H | $CH_3O$ | $C_2H_5O$ | H | O | $C_6H_5CO$ |
| 13 | H | H | $C_2H_5O$ | i-$C_3H_7O$ | H | O | $(CH_3O)_2\overset{O}{\underset{\|}{P}}$ |
| 14 | $CH_3$ | H | $CH_3O$ | $C_6H_5$ | $CH_3$ | O | $(CH_3O)_2\overset{S}{\underset{\|}{P}}$ |
| 15 | $CH_3$ | H | $CH_3O$ | $CH_3O$ | H | O | $(C_2H_5O)_2\overset{O}{\underset{\|}{P}}$ |
| 16 | H | $CH_3$ | $CH_3O$ | $CH_3$ | $CH_3$ | S | CN |
| 17 | $CH_3$ | H | $CH_3O$ | $CH_3O$ | H | S | $COOC_2H_5$ |
| 18 | H | $CH_3$ | $C_2H_5O$ | $C_2H_5O$ | H | S | $CONH_2$ |
| 19 | H | H | $C_2H_5O$ | $CH_3$ | H | S | $COCH_3$ |
| 20 | i-$C_3H_7$ | H | $CH_3O$ | $C_2H_5O$ | n-$C_3H_7$ | S | $C_6H_5CO$ |
| 21 | $C_2H_5$ | H | $CH_3O$ | $C_6H_5$ | H | S | $(CH_3O)_2\overset{S}{\underset{\|}{P}}$ |
| 22 | H | $CH_3$ | n-$C_4H_9O$ | n-$C_4H_9$ | H | S | $(C_2H_5O)_2\overset{S}{\underset{\|}{P}}$ |

Examples 23 to 25 are provided to illustrate the variation in secticidal activity of the trans and cis isomer, a property which is generally applicable to all the compounds prepared by the inventive process.

EXAMPLE 23

The fumigant activity of the compounds prepared by invention and the generally higher potency of th e trans isomer is demonstrated by the following tests wherein slightly moist potting soil is placed in a container with 10 larvae each of Southern corn rootworm and false wireworm.

A filter paper is then treated with an acetone solution containing sufficient compound to provide 0.5 or 1.0 mg. of compound per liter of air in the container containing the insect infested soil. The filter paper is suspended in the container and the container capped. The contents of the container were examined 24 hours after capping and insect mortality determined. The results are shown in Table VI below:

TABLE VI

| Compound | Rate mg./l. | Percent kill of insects 24 hours | |
|---|---|---|---|
| | | Root-worms | Wire-worms |
| $(C_2H_5O)_2\overset{S}{\overset{\|}{P}}-O\diagdown_{C=C}\diagup^H_{CN}$ (trans) $CH_3$ | 1.0<br>0.5 | 100<br>100 | 95<br>100 |
| Cis-isomer of above | 1.0<br>0.5 | 100<br>89 | 70<br>60 |

EXAMPLE 24

Adult house fly (*Musca domestica, L.*) knockdown

Test materials were formulated as 25% emulsifiable concentrates, containing 25% by weight of toxicant, 10% by weight of a non-ionic-anionic emulsifier and 65% by weight of xylene, and diluted to 1.0% and 0.25% with water for spraying on plywood and glass panels, 5½" x 7½". After the panels were sprayed and air-dried, they were placed in one gallon battery jars. One hundred adult female houseflies were placed into the jar, which was then covered with a screen top. Thereafter knockdown counts were made at frequent intervals. The results are shown in Table VII.

TABLE VII

| Compound | Type of surface | Concentration of spray solution percent | Knockdown time 90% knockdown minutes |
|---|---|---|---|
| $(C_2H_5O)_2-\overset{S}{\overset{\|}{P}}-O\diagdown_{C=C}\diagup^H_{CN}$ (trans) $CH_3$ | Glass | 0.25 | 17 |
| Cis-isomer of above | do | 0.25 | 28 |
| Trans-isomer of above | Plywood | 0.25 | 35 |
| Cis-isomer of above | do | 0.25 | 75 |
| Trans-isomer of above | do | 1.0 | 20 |
| Cis-isomer of above | do | 1.0 | 24 |

EXAMPLE 25

The soil insecticidal activity of the compounds prepared by the inventive process is demonstrated by the following test against black cutworms.

Black cutworm—*Agrotis ipsilon* (Hufnagel)

10% granular formulations of trans-O,O-diethyl O-2-cyano-1-methylvinyl phosphorothioate and cis-O,O-diethyl O-2-cyano-1-methylvinyl phosphorothioate on atta-clay were applied at the rate of 1 pound per acre in seven inch bands over planted corn seed. The treated rows were then infested with cutworm larvae and three days thereafter examined for mortality; 62% mortality was recorded for the trans-isomer while only about 30% was observed for the cis-isomer. Five days after treatment 100% control was achieved with the trans-isomer while only about 50% control was obtained with the cis-isomer. The treated areas were then reinfested and the plants watered. Two days thereafter 100% kill was observed for the trans-isomer. Untreated control showed no kill and the cis-isomer was again noted to be about one half as active as the trans-isomer at the level of toxicant fested. At higher levels substantially complete control of black cutworms can also be achieved with cis-O,O-diethyl-O-2-cyano-1-methylvinyl phosphorothioate.

We claim:

1. In a process for preparing a mixture containing the cis isomer (I) and trans isomer (II) of compounds of the group:

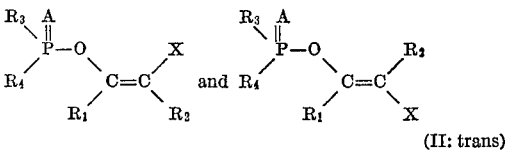

(I: cis)                                  (II: trans)

wherein:

$R_1$ is hydrogen or lower alkyl,
$R_2$ is hydrogen, lower alkyl, or phenyl,
$R_3$ is lower alkoxy,
$R_4$ is lower alkoxy, lower alkyl, or phenyl,
X is CN, $COOR_5$, $CONR_1R_2$, $COR_1$, benzoyl, $R_3$(lower alkoxy)P(A) or $R_3$(lower alkyl)P(A),
$R_5$ is lower alkyl, phenyl, or benzyl, and
A is oxygen or sulfur which comprises reacting in the presence of a strong base and a solvent a phosphorylating agent of the formula:

and an aldehyde or ketone of the formula:

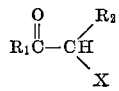

wherein $R_1$, $R_2$, $R_3$, $R_4$, $R_5$, A, and X are as previously defined and Y is halo, an improvement for providing a reaction product in which the trans isomer predominates which comprises carrying out said reaction in the presence of:

(a) a solvent having a dielectric constant greater than 16 and an alkali metal strong base wherein said alkali metal is rubidium or potassium;

(b) a solvent having a dielectric constant greater than about 37 and an alkali metal strong base wherein said alkali metal is sodium; or (c) a solvent (regardless of its dielectric constant) wherein the base is selected from the group consisting of tetra(lower)alkylammonium hydroxides, phenyltri(lower)alkylammonium hydroxides, tolyltri(lower)alkylammonium hydroxides and hydrates thereof.

2. The process of claim 1 wherein the solvents are dimethylformamide and dimethylsulfoxide.

3. The process of claim 2 wherein the base is potassium tertiary butoxide.

4. The process of claim 1 wherein $R_2$ is hydrogen or phenyl, A is sulfur, X is CN, phenyl, or $COOR_5$, and $R_5$ is lower alkyl.

5. In a process for preparing a mixture containing the cis isomer (I) and trans isomer (II) of compounds of the group:

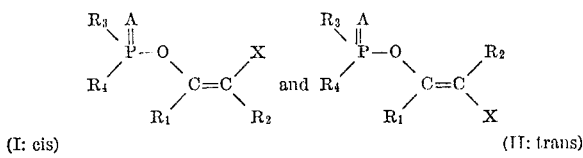

(I: cis)  (II: trans)

wherein:

$R_1$ is hydrogen or lower alkyl,
$R_2$ is hydrogen, lower alkyl, or phenyl,
$R_3$ is lower alkoxy,
$R_4$ is lower alkoxy, lower alkyl, or phenyl,
X is CN, $COOR_5$, $CONR_1R_2$, $COR_1$, benzoyl, $R_3$(lower alkoxy)P(A) or $R_3$(lower alkyl)P(A),
$R_5$ is lower alkyl, phenyl, or benzyl, and
A is oxygen or sulfur which comprises reacting in the presence of a strong base and a solvent a phosphorylating agent of the formula:

and an aldehyde or ketone of the formula:

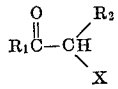

wherein $R_1$, $R_2$, $R_3$, $R_4$, $R_5$, A, and X are as previously defined and Y is halo, an improvement for providing a reaction product in which the cis isomer predominates which comprises carrying out the reaction in the presence of:

(a) a solvent having a dielectric constant less than about 16 and an alkali metal strong base wherein the alkali metal is rubidium or potassium; or (b) a lithium strong base and a solvent.

6. The process of claim 5 wherein $R_2$ is hydrogen or phenyl, A is sulfur, X is CN, phenyl, or $COOR_5$, and $R_5$ is lower alkyl.

References Cited

UNITED STATES PATENTS

| | | | |
|---|---|---|---|
| Re. 25,811 | 6/1965 | Tieman et al. | 260—989 X |
| 3,065,257 | 11/1962 | Erikson et al. | 260—989 |

JOSEPH REBOLD, Primary Examiner

A. H. SUTTO, Assistant Examiner

U.S. Cl. X.R.

260—931, 940, 941, 943, 946, 989; 424—204, 210, 212, 214